Nov. 30, 1943.   E. C. ROGERS   2,335,700
DISTORTION LENS MOUNT
Filed July 5, 1941   4 Sheets-Sheet 1

INVENTOR,
ELWOOD C. ROGERS,
BY Minturn & Minturn,
ATTORNEYS.

INVENTOR,
ELWOOD C. ROGERS,
By Minturn Minturn
ATTORNEYS.

Nov. 30, 1943.   E. C. ROGERS   2,335,700
DISTORTION LENS MOUNT
Filed July 5, 1941   4 Sheets-Sheet 4

INVENTOR,
ELWOOD C. ROGERS,
By Minturn & Minturn,
ATTORNEYS.

Patented Nov. 30, 1943

2,335,700

UNITED STATES PATENT OFFICE 2,335,700

DISTORTION LENS-MOUNT

Elwood C. Rogers, Indianapolis, Ind.

Application July 5, 1941, Serial No. 401,118

12 Claims. (Cl. 88—24)

This invention relates to photographic enlargers and particularly to a lens board to be employed therewith for the purpose of correcting distortion and changing perspective and to lengthen or shorten the image, all without having to stop down the lens to small diaphragm openings. It is a further purpose of the invention to accurately and quickly straighten to exact scale measurement drawings, maps, buildings, scientific subjects, and ordinary pictures photographed at an angle. The invention is employed in an enlarger wherein the paper holder or easel is pivoted to be revolved to any desired lateral angle and at the same time may be rocked from the horizontal.

A further important object of the invention is to provide means for revolving and tilting the lens incorporated in a very simple yet effective mechanism preventing reflection or passage of light from the light source past the lens mounting. A further important object of the invention is to provide such a lens mounting wherein the lens may be tilted or revolved to any predetermined angle in order to duplicate and obtain identical enlargements from a given negative.

Figure 1:
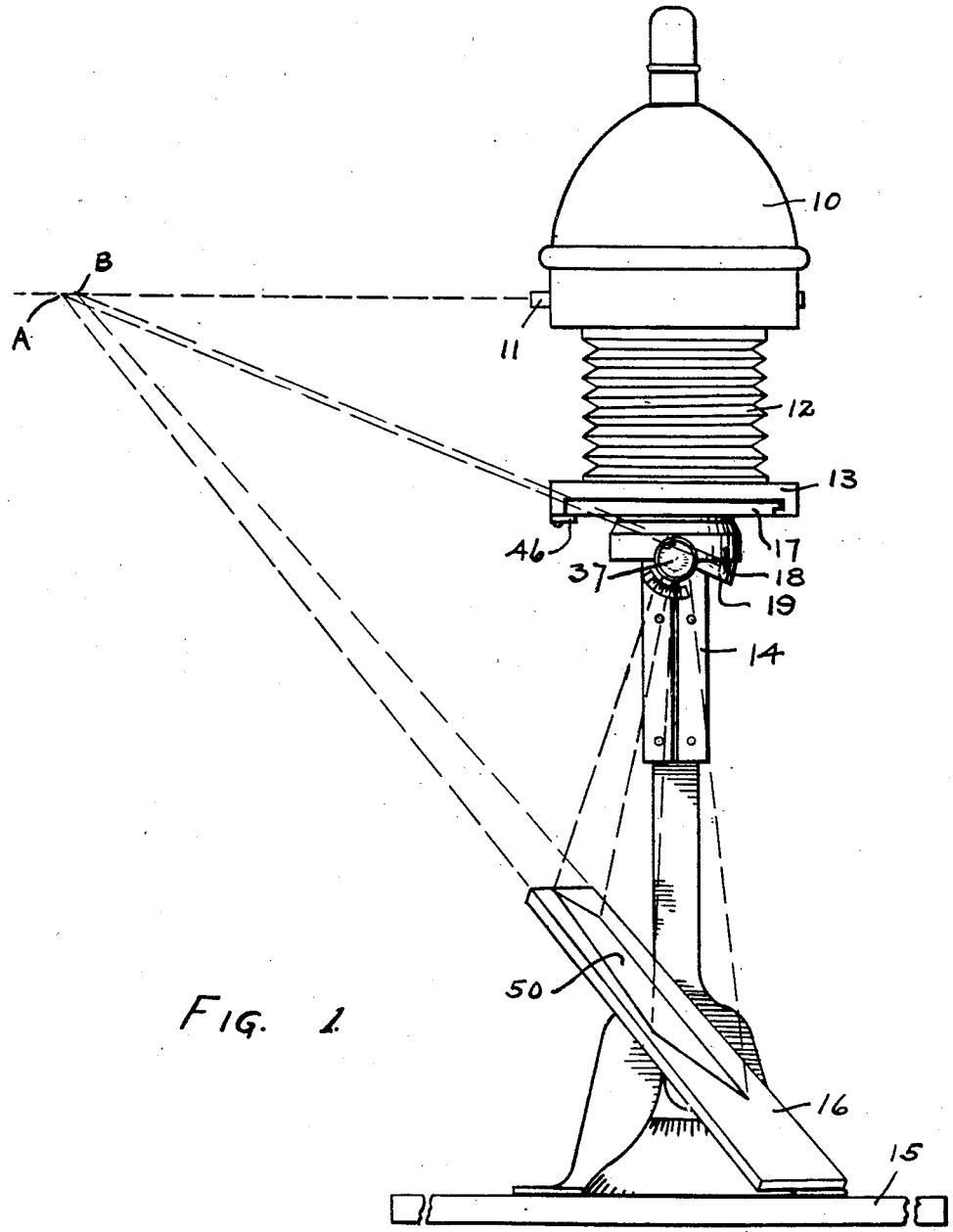
Figure 2:
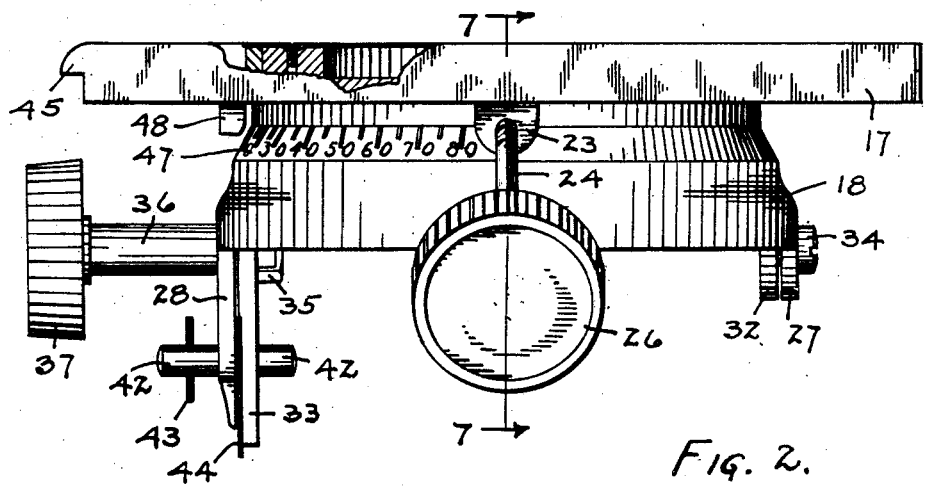
Figure 3:
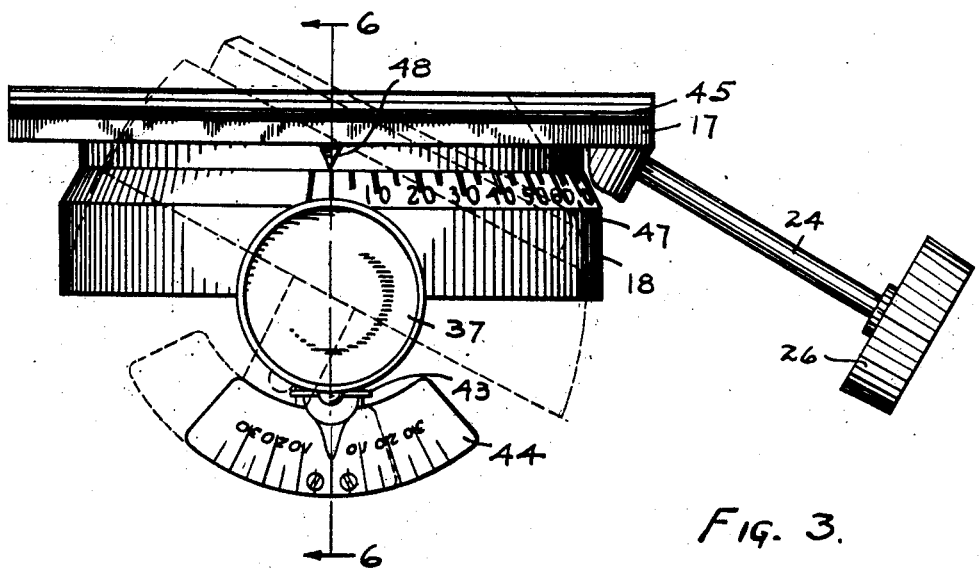
Figure 4:
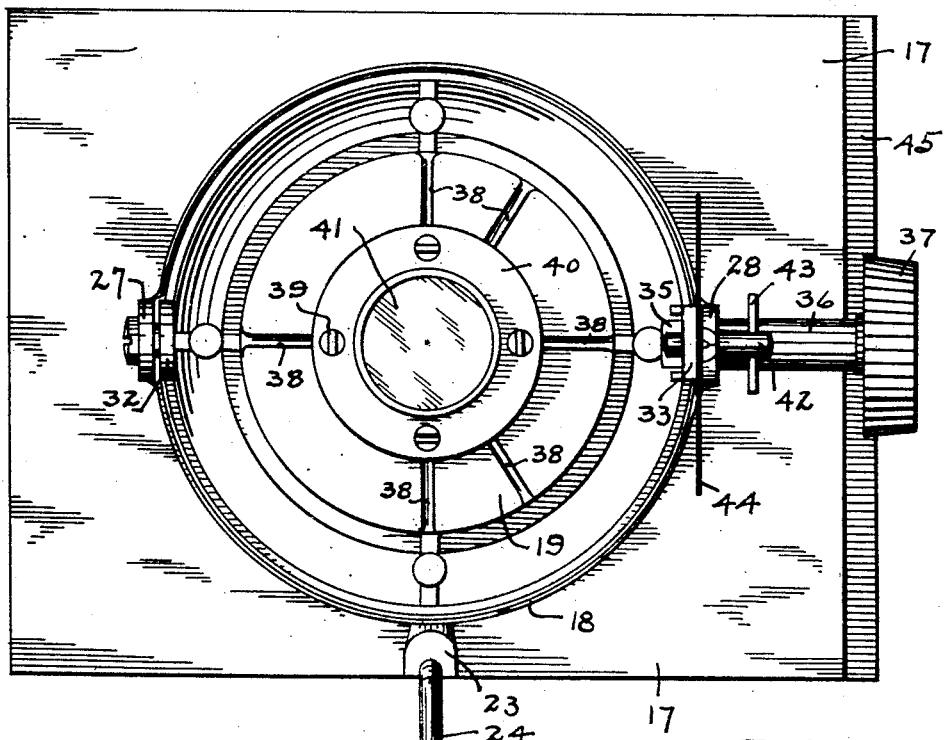
Figure 5:
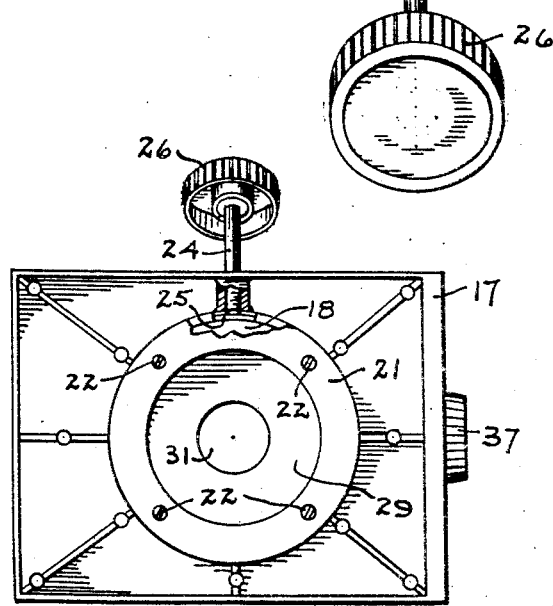
Figure 6:
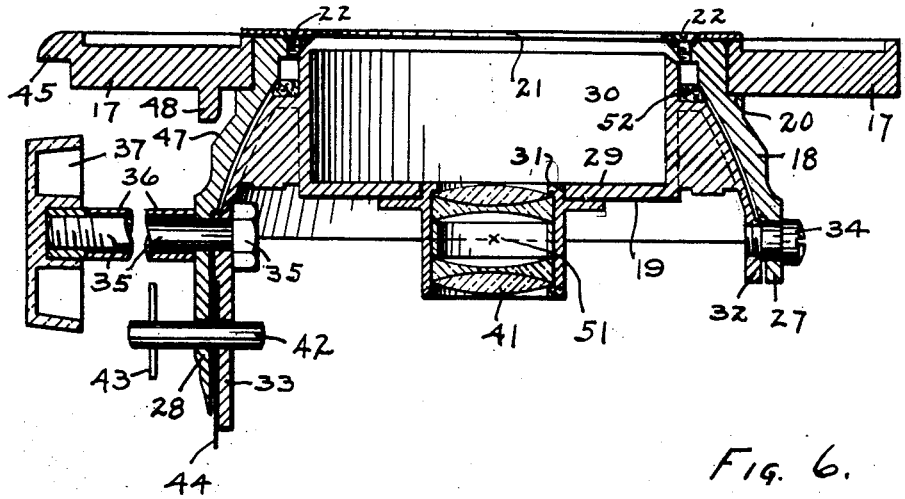
Figure 7:
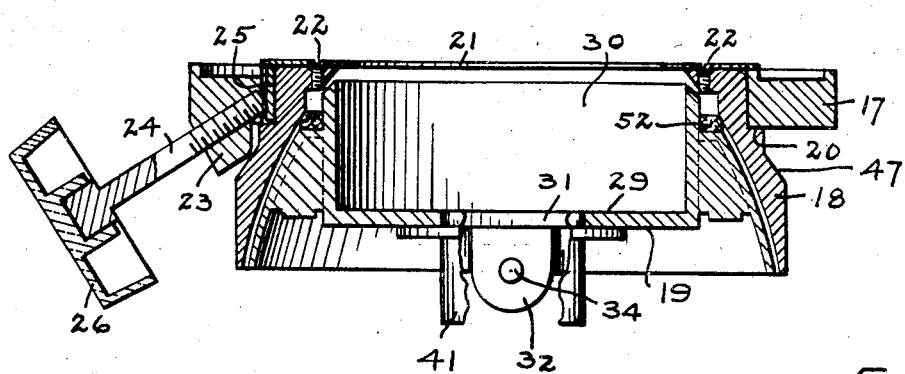

These and other important objects and advantages of the invention will become apparent to those versed in the art in the following description of one particular form with reference being made to the accompanying drawings, in which Fig. 1 is a front elevational view of an enlarger to which the invention is applied;

Fig. 2, a view in front elevation on an enlarged scale of the lens board;

Fig. 3, a view in left-hand end elevation of the lens board;

Fig. 4, a view in bottom plan;

Fig. 5, a top plan view on reduced scale;

Fig. 6, a view in central vertical section on the line 6—6 in Fig. 3;

Fig. 7, a view in central vertical section on the line 7—7 in Fig. 2; and

Figure 8:
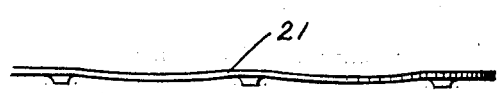

Fig. 8, a view in side elevation of a lens mount retaining washer.

Like characters of reference indicate like parts throughout the several views in the drawings.

Referring to Fig. 1, a photographic enlarger is shown having a lamp housing 10 with a negative holder 11 thereunder below which is the usual bellows 12 terminating with a lens board mounting head 13, the head 13 being adjustable along the standard 14, all in the well known and usual manner for adjustable focusing. On the base 15 supporting the standard 14 is mounted an easel 16 in any suitable manner to be horizontally revoluble and also tiltable thereon, the exact mechanism permitting this action not forming a part of this present invention. It is necessary, however, that such a mounting be provided that the table will be pivoted upon the optical center of the enlarger.

Now in place of the customarily employed fixed lens board, the structure forming the present invention is removably carried by the head 13. This lens board consists essentially of the supporting plate 17, generally rectangular in shape to conform to the opening provided through the head 13; a horizontally revoluble bell 18; and mounted therewithin the lens board proper 19 supported on horizontally disposed trunnions within the bell 18.

The bell 18 has an upper outer cylindrical surface entering with a running fit into a circular bore centrally provided in the plate 17. An annular shoulder 20 at the lower end of this cylindrical surface limits the insertion thereof into the plate hole so as to have the upper end of the bell in substantially the same plane as the top side of the plate immediately surrounding the circular hole therethrough. The bell 18 is held in this position by means of a metallic washer 21 herein shown as having an external diameter exceeding that of the hole through the plate 17 and having an internal diameter substantially the same as that of a hole provided through the upper end of the bell 18.

This washer 21 is secured to the upper end of the bell 18 by a plurality of screws 22, herein shown as four in number, slidingly passing through the washer and screw-threadedly engaging in the upper end of the bell. A peculiar feature of this washer 21 is that in the zones between the holes for the screws 22, the washer is deformed by being curved initially downwardly therebetween. The washer is made out of a spring-like material so that when the screws are seated, the bell 18 is pulled yieldingly upwardly to retain the shoulder 20 in running or sliding contact with an under surface of the plate 17, the spring pressure exerted thereby being sufficient to prevent lost motion therebetween and yet permitting easy turning of the bell 18 in reference to the plate 17.

The interior of the bell 18 is formed to have a generally spherically-shaped inner wall face, the bell 18 opening from its under side by a larger diameter than that of the top opening.

A boss 23 extends downwardly from the under side of the plate 17 to receive diagonally therethrough a stem 24 screw-threadedly engaging within the boss 23 and having an end directed toward a shoe 25 that bears against the cylindrical surface of the bell 18 within the hole in the plate 17. The stem 24 is provided with a handwheel 26 as a turning means so as to advance the end of the stem toward or retract it from the shoe 25. By advancing the stem 24 against the shoe 25, sufficient pressure may thereby be exerted to prevent horizontal rotation of the bell 18 within the plate 17.

The bell 18 is provided with an ear 27 extending downwardly at one side thereof and an elongated ear 28 extending downwardly therefrom diametrically opposite the ear 27.

The lens board 19 is peculiarly formed to have a side wall having a generally external spherical surface so proportioned as to permit the lens board being inserted into the bell 18 through its lower opening as indicated in Figs. 6 and 7, to form generally a ball and socket arrangement. The lens board 19 is further formed to have a floor 29 located at the bottom of a cylindrical well 30 which is open at its top end, terminating a slight distance below the washer 21 when the board is mounted within the bell 18. The floor 29 is provided with a central hole 31 therethrough.

The lens board 19 is further provided with a pair of downwardly extending ears 32 and 33, one diametrically positioned opposite the other and the ear 33 being quite elongated in respect to the ear 32. A screw 34 serving as a trunnion is slidingly passed through the ear 27 and screw-threadedly engaged in the ear 32. On the opposite side, a bolt 35 slidingly passes through upper portions of the ears 33 and 28 to serve as a trunnion on that side in axial alignment with the screw 34. The bolt 35 extends freely through a sleeve 36 and screw-threadedly engages with a handwheel 37, an inner portion of which is brought into abutment with the outer end of the sleeve 36 when the wheel 37 is revolved to tend to pull the bolt 35 outwardly.

The lens board 19 may, when the handwheel 37 is loosened on the bolt 35, be revolved on its horizontal axis coinciding with the common axis through the screw 34 and bolt 35. The board may be held in any tilted position by running the handwheel 37 down on the bolt 35 to thus clamp it in position in reference to the bell 18.

The under side of the floor 29 is provided with a flat face preferably having, Fig. 4, a plurality of locating grooves 38 extending radially thereacross, herein shown as six in number, four of them being ninety degrees apart and two of them each being thirty degrees from a diametrical line across the floor. These grooves are provided for the purpose of easy and quick location for drilling of holes to receive the screws 39 there employed through the flange 40 of the lens 41 for securing the lens flange to the under side of the floor 29. Some of these flanges are drilled for four screws, as shown in Fig. 4, whereas some are drilled for three, in which case the two thirty degree grooves are employed in addition to the groove on the opposite side bisecting the angle therebetween. But these grooves may vary in number and location to suit different number of screw holes in different lens mounting flanges.

The under side of the lens board floor 29 is located that distance above the axis of rotation of the lens board (axis of the screw 34 and bolt 35) which will cause that axis to extend substantially through the nodal point 51 within the system of the lens 41. One particular lens system is indicated in section in Fig. 6, but the invention is not limited to that precise system. The system in any form will be located to have its nodal point substantially on the lens board tilting axis. Thus, however the lens may be tilted and revolved, the nodal point 51 is never removed any appreciable amount from the optical center line of the machine by reason of the lens board tilting axis passing through that point. This location of the nodal point on the optical center line and lens tilting axis is desirable to eliminate shifting of the image on the easel board.

When the lens board is to be maintained to have its under face parallel to the plate 17, a tapered pin 42 is inserted through the aligned holes provided in the ears 28 and 33, Fig. 6, a cross pin 43 being provided in the pin 42 to facilitate removal of the pin 42 when desired. The lower end of the ear 28 is shaped in the nature of a pointer. Mounted on the outer face of the ear 33 and behind the ear 28 is a gauge plate 44 having etched or otherwise placed thereon graduations in degrees running both ways from a center line so that the degree of tilting of the lens board is readily observed by noting the position of the end of the pointer on the ear 28 over the plate 44 as it may be moved therebehind. The pin 42, of course, has to be removed to permit the tilting and also the handwheel 37 must be loosened. The lens board is shown in a tilted position by dash lines in Fig. 3.

The structure described is mounted on the head 13, Fig. 1, by placing the plate 17 thereacross from the under side in the usual and well known manner, a lip 45 on the plate engaging within a groove along one side of the head 13 and a latch bar 46 being swung around against the under side of the other end of the plate.

The negative (not shown) to be projected is placed in the negative carrier 11 and projection of light from the housing 10 is had therethrough, through the lens 41 and down onto the easel 16, sensitized paper being placed thereon in the usual and well known manner. The easel 16 is tilted and the lens board 19 tilted and revolved; and the image focused until it is sharp over the entire surface. When properly focused, the plane perpendicular to the lens axis and including the lens nodal point and the plane of the easel 16, when extended, cut the horizontal plane of the negative. The easel and lens board planes must intercept the negative plane on a common line AB. This line may change in location in the negative plane but must always be in that plane. The axes of tilt of the lens board and of the easel are always parallel regardless of the degree of tilt of each.

The foregoing conditions are achieved by revolving the easel 16 laterally until the axis of the tilt of the easel is parallel to the axis of tilt of the camera when the original picture was taken to produce the negative used in the enlarging process. This condition is readily determined by observation, or by measurement of images or measurement of presurveyed points, of the projected image 50 appearing on the easel 16. Upon obtaining parallelism of the two axes, the easel is then tilted to an angle to secure the desired amount of correction. The lens is then revolved by turning the bell 18 horizontally in reference to the plate 17 to the same degree of turning of the easel, and then the lens board is tilted about the axis through the screw 34 and bolt 35 until the image on the easel is sharp throughout its projection on the easel. The lens board must be tilted at different angles for different size pictures, and therefore it is easy to tilt the lens to the correct angle by observing the image. By recording the degrees indicated on the gauge plate 44 and also indicated around the inclined surface 47 on the bell 18 in reference to an indicator 48, the image may be exactly reproduced at will.

Following the method outlined, distortion in the original negative and change in perspective may thus be corrected in the enlargement on the easel. Of course for straight enlargements, the lens board may be rocked to the horizontal position and the pin 42 placed through the ears 33 and 28. The bell 18 may also be locked by the handwheel 26.

The inner surface of the well 30 and also the entire top area of the plate 17 are processed to have a black non-reflecting surface for light. By reason of the spherical shapes of the external and internal walls respectively of the lens mounting 19 and the bell 18, no light may normally travel therebetween to by-pass the lens 41. This, as will be noted, is achieved by the structure above described, all without having to employ flaps, or light shields. A felt washer 52 may be employed to encircle the wall of the lens board to seat in an annular recess therearound as indicated in Figs. 6 and 7. The felt washer would serve as an absolute block to reflected light rays.

While the invention has herein been described in the one precise form, it is obvious that structural variations may be employed, such, for example, as the means for securing the various parts in any desired positions, all without departing from the spirit of the invention and I therefore do not desire to be limited to that precise form beyond the limitations as may be imposed by the following claims.

I claim:

1. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis.

2. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, said bell axis coinciding with said optical axis, and said trunnion axis intersecting said optical axis at right angles thereto.

3. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, said trunnion members holding said lens board wall in close proximity to but spaced from said bell interior wall face.

4. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, one of said trunnion members consisting of a bolt passing through portions of both the lens board wall and the bell, and means engaging said bolt externally of the bell to pull the bolt to tend to shift said lens board wall into engagement with said bell to prevent relative movement therebetween to comprise said further means.

5. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, aligned ears extending from opposite sides of said bell and said lens board wall carrying said trunnion members, the adjacent ears on one side being extended beyond the trunnion member therethrough, a pointer on one of said extended ears, and a gauge on the other ear, whereby the degree of relative travel therebetween as occasioned by rocking said lens board may be observed on the gauge in reference to the pointer, and means for indicating the degree of rotation of said bell.

6. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, aligned ears extending from opposite sides of said bell and said lens board wall carrying said trunnion members, the adjacent ears on one side being extended beyond the trunnion member therethrough, a pointer on one of said extended ears, and a gauge on the other ear, whereby the degree of relative travel therebetween as occasioned by rocking said lens board may be observed on the gauge in reference to the pointer, and means for indicating the degree of rotation of said bell, said extended ears each having a hole therethrough in alignment when said lens board face is at right angles to said optical axis, and a pin releasably inserted in said holes to maintain said alignment.

7. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, said bell position securing means comprising a shoe normally loosely contacting said bell neck, and a stem screw-threadedly carried by said plate to have one end directed toward said shoe, and a handwheel on said stem for manipulation thereof.

8. An attachment for a photographic enlarging machine having a light source, a negative holder, and a paper holding easel mounted to swing and tilt on the optical axis of the machine, comprising an attaching plate having a substantially optically centered opening therethrough defined by a cylindrical wall, a bell open at both ends and having a cylindrical hollow neck slidingly entered in said plate hole to bear on said wall, means limiting the travel of said neck through said hole, spring means engaging said neck and bearing on said plate to retain the neck within the plate hole, the interior of said bell flaring outwardly from said neck spherically to its other end, a lens board, a wall extending around and from said board to enter by a substantially spherical surface within said bell, trunnion members interengaging said bell and said lens board wall to rockably maintain said wall in said bell whereby the lens board may be rocked on the trunnion axis in relation to the bell, said lens board having a face on which a lens may be mounted, means releasably securing said bell in selected positions of rotation about its axis, and further means releasably fixing said lens board in selected positions of rocking about said trunnion axis, said spring means consisting of a thin spring material washer initially bowed between attaching zones sprung back into a common plane bearing against the top end of said bell neck by being attached thereto, said washer having an outer marginal portion extending beyond said neck to overlap onto said plate in yielding sliding contact therewith.

9. In a distortion lens board attachment for photographic enlarging machines, an attaching plate having a central opening therethrough defined by a cylindrical wall, a hollow member having a neck slidably fitted in said plate opening to form a bearing with said wall whereby the neck may turn circumferentially therearound, a shoulder around said member bearing against one side of the plate, a lens board member rockably mounted on said hollow member, and a spring washer secured to said neck on the other side of the plate extending beyond the neck to lap over onto the plate, said washer initially having deformed portions, and means securing the washer to said neck.

10. For correcting and changing distortion and perspective appearing in an original photographic negative, in a machine having a light source, a negative holder, and a tiltable and laterally rockable easel, the combination of a lens mounting comprising a plate for mounting in juxtaposition with said holder and having a hole therethrough centered substantially on the optical axis of said machine, a member having an opening therethrough, means securing said member to said plate to have the member hole axis coincide with the plate hole axis and to permit rotation of the member about said axis, a lens board, and means mounting the board on an axis normal to and intersecting said first axis, whereby said lens board may be rocked to have its said normal axis parallel to the tilting axis of said easel in selected positions thereof, said lens board having a face for mounting a lens thereon, the hole in said member flaring outwardly from said plate spherically to an outer opening of less diameter than that of the curvature thereof, a wall about said lens board having an externally spherical curvature fitting within and in close proximity to the wall of said member hole, and said mounting means being arranged to allow the lens board wall to swing within the said member hole, whereby light from said source is prevented from passing between said lens board wall and the wall of said member hole, means for securing said member in any predetermined position of its rotation, and means for securing said lens board in a rocked position, and further means for securing the lens board in a central non-rocked position in relation to said member, a lens system carried on said face, and said normal axis passing through the nodal point of said system.

11. In a photographic enlarger having a light source, a negative carrier, and a lens focusing mechanism; means including a pair of relatively shiftable parts one circumferentially revoluble and the other carried by and rockable on an axis normal to the first part for tiltably mounting a lens on said mechanism to permit tilting of the lens in any direction within the limits of light transmitting practicability from said light source, said parts having coordinating surfaces serving as a light trap, a resilient filler washer between said surfaces, and means on one of said parts carrying said washer in fixed relation thereto.

12. In a photographic enlarger having a light source, a negative carrier, and a lens focusing mechanism; means including a pair of relatively shiftable parts one circumferentially revoluble and the other carried by and rockable on an axis normal to the first part for tiltably mounting a lens on said mechanism to permit tilting of the lens in any direction within the limits of light transmitting practicability from said light source, said parts having coordinating surfaces serving as a light trap, a resilient filler washer between said surfaces, and means on one of said parts carrying said washer in fixed relation thereto, said washer carrying means consisting of an annular recess within which the washer engages.

ELWOOD C. ROGERS.